United States Patent
Kobayashi et al.

(10) Patent No.: US 7,609,304 B2
(45) Date of Patent: Oct. 27, 2009

(54) CCD CAMERA WITH A PLURALITY OF SENSOR AREAS AND CORRESPONDING OUTPUT CHANNELS CORRECTING IMAGE USING A CLAMPING PROCESS

(75) Inventors: Akio Kobayashi, Kyoto (JP); Mitsuaki Kurokawa, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 641 days.

(21) Appl. No.: 11/347,369

(22) Filed: Feb. 6, 2006

(65) Prior Publication Data

US 2006/0176380 A1 Aug. 10, 2006

(30) Foreign Application Priority Data

Feb. 7, 2005 (JP) ............................. 2005-030256

(51) Int. Cl.
*H04N 5/217* (2006.01)
(52) U.S. Cl. ..................... 348/241; 348/243; 348/222.1
(58) Field of Classification Search ................. 348/241, 348/243, 245, 230.1
See application file for complete search history.

(56) References Cited

U.S. PATENT DOCUMENTS 6,337,713 B1 * 1/2002 Sato ........................... 348/311

2003/0090577 A1 * 5/2003 Shirakawa ................ 348/222.1
2003/0193591 A1 * 10/2003 Miyahara ..................... 348/294
2004/0062454 A1 * 4/2004 Komiya et al. .............. 382/284

FOREIGN PATENT DOCUMENTS

| JP | 05227429 A | * | 9/1993 |
| JP | 2002-300477 | | 10/2002 |
| JP | 2003-259224 | | 9/2003 |

* cited by examiner

*Primary Examiner*—David L Ometz
*Assistant Examiner*—Angel L Garces-Rivera
(74) *Attorney, Agent, or Firm*—Kratz, Quintos & Hanson, LLP

(57) ABSTRACT

An electronic camera includes a CCD imager. The CCD imager has an imaging surface in which two sensor areas are formed. A raw image produced in one sensor area is output from a channel CH1, and a raw image produced in the other sensor area is output from a channel CH2. The raw image from the channel CH1 is clamped by a clamp circuit at a clamp level LV1, and the raw image from the channel CH2 is clamped by another clamp circuit at a clamp level LV2. The clamp level LV1 matches an optical black level VCL of the raw image from the channel CH1. The clamp level LV2 matches a subtraction level "VCL−(VAL−VAR)" determined by subtracting a difference between a preliminary feeding level VAL of the raw image from the channel CH1 and a preliminary level VAR of the raw image from the channel CH2, from the black level VCL of the raw image from the channel CH1.

7 Claims, 4 Drawing Sheets

(A) CH1 OUTPUT (B) CH2 OUTPUT

AL, AR : PRELIMINARY FEEDING TIME PERIOD
BL, BR : OB TIME PERIOD WITHOUT SENSOR
CL, CR : OB TIME PERIOD WITH SENSOR
DL, DR : EFFECTIVE IMAGE TIME PERIOD

CCD CAMERA WITH A PLURALITY OF SENSOR AREAS AND CORRESPONDING OUTPUT CHANNELS CORRECTING IMAGE USING A CLAMPING PROCESS

CROSS REFERENCE OF RELATED APPLICATION

The disclosure of Japanese Patent Application No. 2005-030256 is incorporated herein by reference.

BACKGROUND OF THE INTENTION

1. Field of the Invention

The present invention relates to an electronic camera. More specifically, the present invention relates to an electronic camera that subjects an image signal output from an image sensor to a clamp process.

2. Description of the Prior Art

One example of this kind of conventional apparatus is disclosed in patent document 1 (Japanese Patent Laid-open No. 2003-259224). In accordance with this conventional art, two adjacent imaging areas are formed on an imaging surface, and a surveillance area is assigned to those two imaging areas in such a manner as to straddle a boundary line between them. A difference in level between two image signals generated at the two imaging areas is determined with attention given to the surveillance area to determine. Each of the two image signals is provided with some gain so as to dissolve the level difference. This makes less visible a difference of grade in a synthetic image based on the two image signals.

However, the two image signals derived from the imaging elements are output from different paths, which results in a discrepancy between levels of noises superimposed on the image signals in their paths. In the conventional art, no consideration is given to such a discrepancy in noise level and thus there is a limit to obtaining an improvement in quality of synthetic image.

SUMMARY OF THE INVENTION

Therefore, it is a primary object of the present invention to provide a novel electronic camera.

It is another object of the present invention to provide an electronic camera that is capable of further improving image quality.

According to claim 1, an electronic camera comprises: an imager having an imaging surface in which a first photoelectric conversion area and a second photoelectric conversion area are formed and a first output path and a second output path assigned to the first photoelectric conversion area and the second photoelectric conversion area, respectively; a first driver for outputting from the first output path a first partial image produced in the first photoelectric conversion area; a second driver for outputting from the second output path a second partial image produced in the second photoelectric conversion area; a first damper for subjecting the first partial image output from the first output path to a clamp process according to a first clamp level; a second damper for subjecting the second partial image output from the second output path to a clamp process according to a second clamp level; a first setter for setting a black level of the first partial image output from the first output path as a first clamp level; a subtracter for subtracting a difference between a preliminary feeding level of the first partial image output from the first output path and a preliminary feeding level of the second partial image output from the second output path, from the black level of the first partial image output from the first output path; and a second setter for setting the level determined by the subtracter as the second clamp level.

The imager has the imaging surface in which the first photoelectric conversion area and the second photoelectric conversion area are formed and the first output path and the second output path assigned to the first photoelectric conversion area and the second photoelectric conversion area, respectively. The first partial image produced in the first photoelectric conversion area is output by the first driver from the first output path, and the second partial image produced in the second photoelectric conversion area is output by the second driver from the second output path.

The first partial image output from the first output path is subjected by the first damper to the clamp process according to the first clamp level, and the second partial image output from the second output path is subjected by the second damper to the clamp process according to the second clamp level. The first clamp level is set by the first setter, and the second clamp level is set by the second setter.

The first clamp level matches the black level of the first partial image output from the first output path. On the other hand, the second clamp level matches the subtraction level determined by subtracting a difference between the preliminary feeding level of the first partial image output from the first output path and the preliminary feeding level of the second partial image output from the second output path, from the black level of the first partial image output from the first output path. Besides, the subtraction level is calculated by the subtracter.

The first partial image and the second partial image are output from the different output path, and thus which may cause a discrepancy between the levels of noises superimposed on the first partial image and the second partial image output from the imaging means, that is, the levels of external noises.

Here, the level of the external noise superimposed on the first partial image can be equated with the preliminary feeding level of the first partial image. The level of the external noise superimposed on the second partial image can be equated with the preliminary feeding level of the second partial image. Accordingly, the difference between the preliminary feeding level of the first partial image and the preliminary feeding level of the second partial image can be regarded as a discrepancy amount of external noise.

Thus, in the present invention of claim 1, the black level of the first partial image is taken as the first clamp level, while the level determined by subtracting the difference between the preliminary levels from the black level of the first partial image is assumed as the second clamp level. This dissolves the discrepancy between the clamp levels resulting from the external noises.

In addition, both the first clamp level and the second clamp level are set according to the black level of the first partial image. This eliminates the discrepancy between the clamp levels resulting from the difference between the black level of the first partial image and the black level of the second partial image.

According to the electronic camera of claim 2 depending on to claim 1, the first driver and the second driver output the first partial image and the second partial image, respectively, in a manner of raster scanning. This generates periodically the preliminary feeding time period, thereby making it easy to detect the preliminary feeding level.

According to the electronic camera of claim 3 depending on claim 1, the first photoelectric conversion area has an optical black area, and the first setter includes the black level detector for detecting the black level with timing corresponding to the optical black area. This makes it possible to adjust accurately the first clamp level and the second clamp level.

The electronic camera of claim 4 depending on claim 1 further comprises the producer for producing a screenful of still image based on the first partial image subjected by the first damper to a clamp process and the second partial image subjected by the second damper to a clamp process.

According to the electronic camera of claim 5 depending on claim 4, the first driver and the second driver output periodically the first partial image and the second partial image, respectively, and the producer produces periodically the still image. This makes the output of moving images.

According to the electronic camera of claim 6 depending on claim 1, the first photoelectric conversion area and the second photoelectric conversion area are adjacent to each other on the imaging surface.

According to the electronic camera of claim 7 depending on claim 1, the subtracter includes the black level detector for detecting the black level of the first partial image output from the first output path, the first preliminary feeding level detector for detecting the preliminary feeding level of the first partial image output from the first output path, the second preliminary feeding level detector for detecting the preliminary feeding level of the second partial image output from the second output path, the level subtracter for subtracting the preliminary feeding level detected by the first preliminary feeding level detector from the black level detected by the black level detector, and the level adder for adding result of subtraction by the first level subtracter to the preliminary feeding level detected by the second preliminary feeding level detector.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
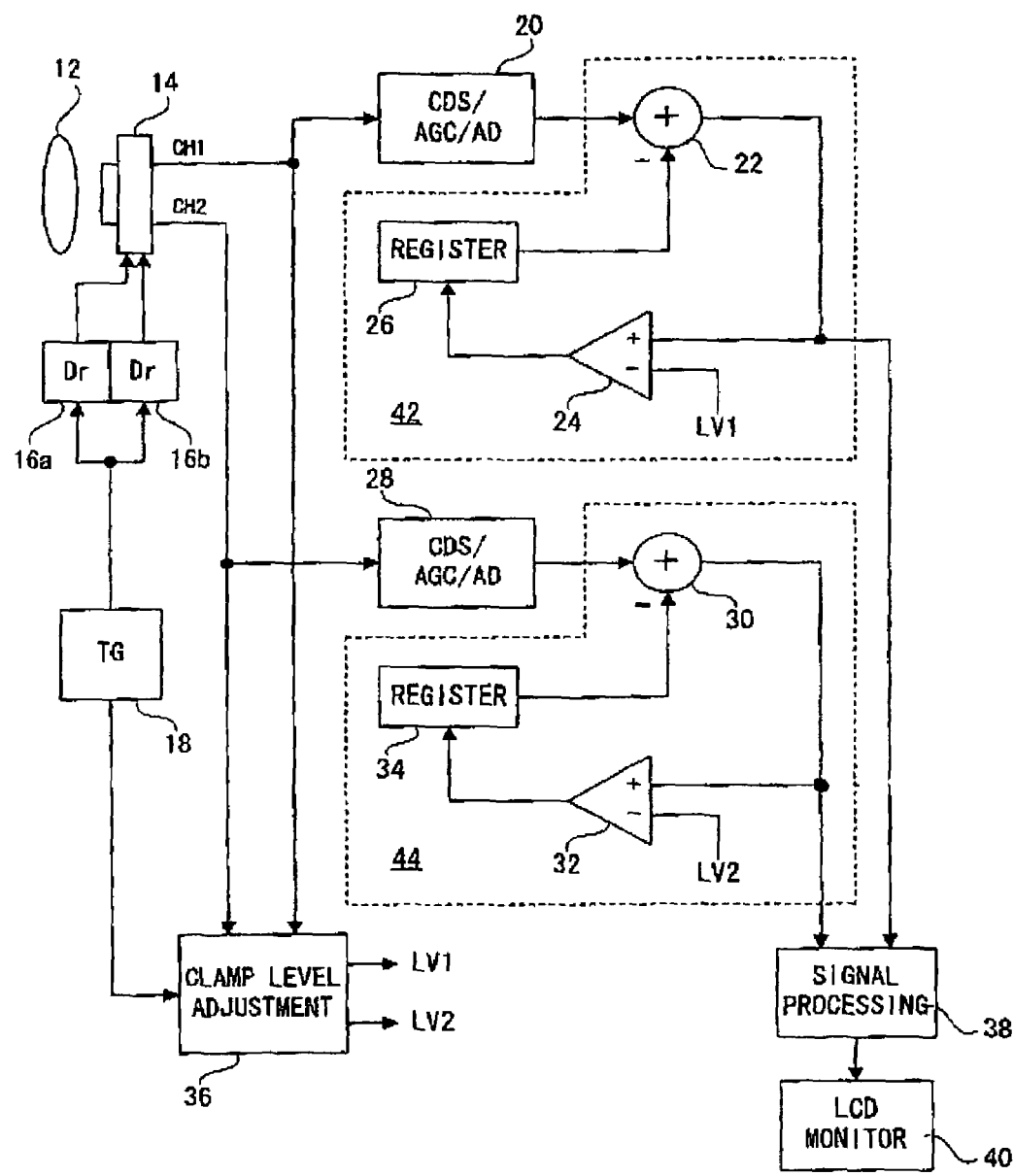
FIG. 1 is a block diagram showing configuration of one embodiment of the present invention.

Referring to FIG. 1, a digital camera (electronic camera) of this embodiment includes an optical lens 12. An optical image of object scene is irradiated to an imaging surface of a CCD imager 14 via the optical lens 12, and is subjected to photoelectric conversion by means of a plurality of light-receiving elements formed on the imaging surface. One light-receiving element is equivalent to one pixel.

The imaging surface is covered with a Bayer pattern of color filter (not shown). Accordingly, electric charges produced by the light-receiving elements to which a filter element of R (Red) is assigned have color information of R, electric charges produced by the light-receiving elements to which a filter element of G (Green) is assigned have color information of G, and electric charges produced by the light-receiving elements to which a filter element of B (Blue) is assigned have color information of B.

A TG (Timing Generator) 18 generates a plurality of timing signals including a horizontal synchronizing signal Hsync and a vertical synchronizing signal Vsync. The drivers 16a and 16b each drive the CCD imager 14 in response to those timing signals. The electric charges generated on the imaging surface, that is, the raw image signals are output from the CCD imager 14 at the rate of one frame per 1/30 second.

Figure 2:
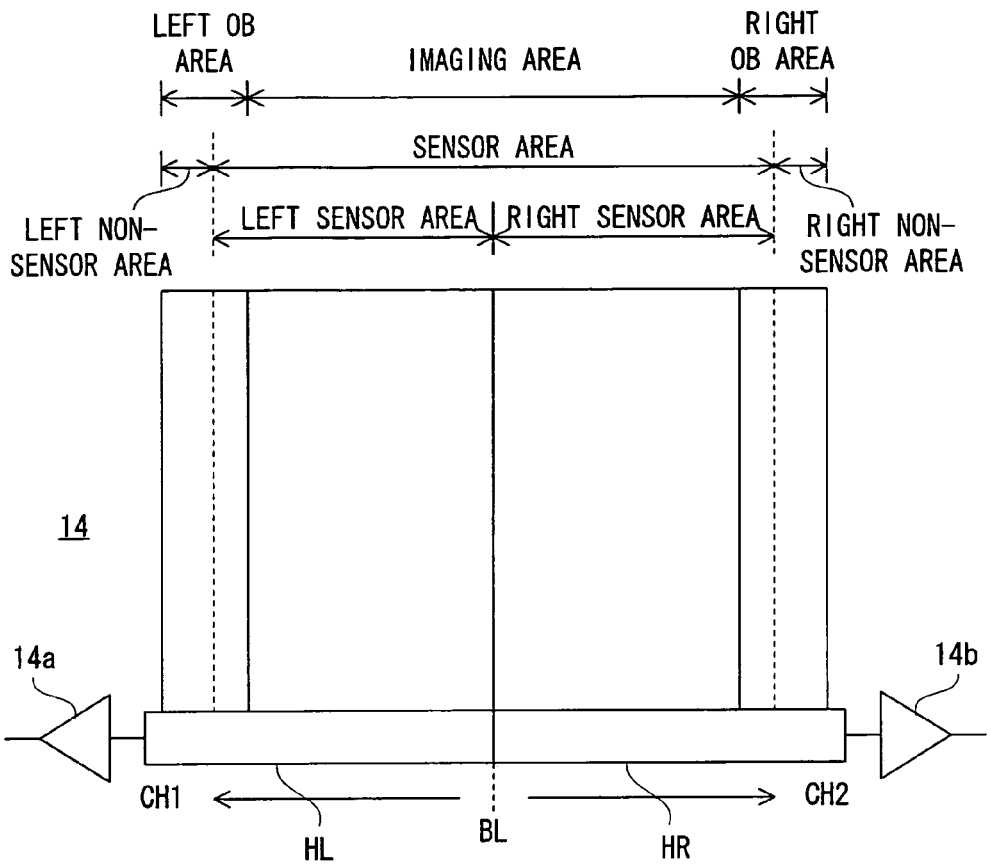
FIG. 2 is an illustrative view showing one example of configuration of an image sensor applied to the FIG. 1 embodiment.

Referring to FIG. 2, the imaging surface of the CCD imager 14 has a sensor area (photoelectric conversion area) in which the plurality of light-receiving elements are arranged, a left non-sensor area and a right non-sensor area in which no light-receiving elements are arranged. An imaging area is formed by an area where several pixels at both ends in the horizontal direction are excluded from the sensor area. A left OB (Optical Black) area is formed by several pixels at left end of the sensor area and the left non-sensor area. The right OB area is formed by several pixels at right end of the sensor area and the right non-sensor area. In addition, the left OB area and the right OB area are the same in size.

The sensor area has a left sensor area and a right sensor area. The left sensor area is formed on the left of a boundary line BL extending from center of the imaging surface in the vertical direction, and the right sensor area is formed on the right of the same boundary line BL. Accordingly, the left sensor area and the right sensor area are adjacent to each other on the boundary line BL. A plurality of vertical transfer registers, although not shown, are assigned to the left sensor area and the right sensor area. Besides, vertical transfer registers are also assigned to the left non-sensor area and the right non-sensor area.

Horizontal transfer registers HL are connected to ends of the vertical transfer registers arranged on the left of the boundary line BL. Also, horizontal transfer registers HR are connected to ends of the vertical transfer registers arranged on the right of the boundary line BL. Thus, the electric charges generated by the plurality of light-receiving elements on the left sensor area are transferred by the vertical transfer registers not illustrated and the horizontal transfer registers HL, and then are output through an amplifier 14a. Likewise, the electric charges generated by the plurality of light-receiving elements on the right sensor area are transferred by the vertical transfer registers not illustrated and the horizontal transfer registers HR, and then are output through an amplifier 14b.

More specifically, the driver 16a subjects the left sensor area to raster scanning based on the timing signals from the TG 18, and outputs a raw image signal for left ½ frame through a channel CH1. In similar fashion, the driver 16b subjects the right sensor area to raster scanning based on the timing signals from the TG 18, and outputs a raw image signal for right ½ frame through a channel CH2.

However, a direction of transfer by the horizontal transfer registers HR is the reverse of a direction of transfer by the horizontal transfer registers HL. Therefore, a direction of raster scanning is inverted between the left sensor area and the right sensor area.

Figure 3:
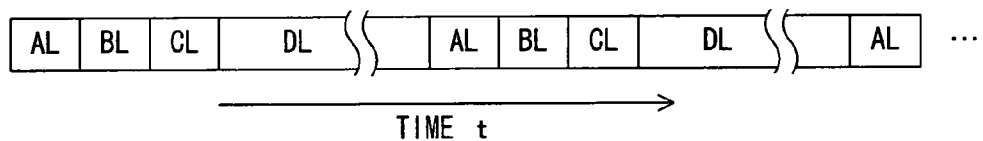
FIG. 3(A) is a timing chart showing one example of output from a channel CH1 of the image sensor.
FIG. 3(B) is a timing chart showing one example of output from a channel CH2 of the image sensor.
Figure 3:
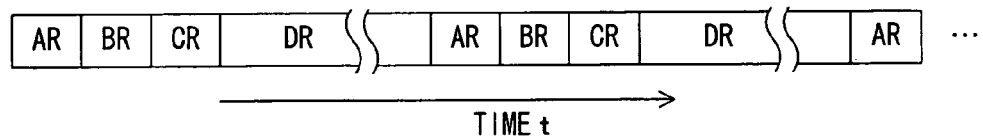

As a result, output of the channel CH1 changes in a manner shown in FIG. 3(A), and output of the channel CH2 changes in a manner shown in FIG. 3(B). According to FIG. 3(A), time periods AL, BL, CL and DL come repeatedly in this order. According to FIG. 3(B), time periods AR, BR, CR and DR come repeatedly in this order. Among them, the time periods AL and AR are preliminary feeding time periods resulting from the raster scanning, and the time periods BL and BR are time periods corresponding to the non-sensor areas forming the OB areas. In addition, the time periods CL and CR are time periods in correspondence with one part of the sensor area forming the OB areas, and the time periods DL and DR are time periods corresponding to another part of the sensor area forming the imaging area.

Therefore, the raw image signal from the channel CH1 shows a preliminary feeding level VAL at the period AL, an optical black level VBL at the period BL, an optical black level VCL at the period CL, and an effective image level VDL at the period DL. Likewise, the raw image signal from the channel CH2 shows a preliminary feeding level VAR at the period AR, an optical black level VBR at the period BR, an optical black level VCR at the period CR, and an effective image level VDR at the period DR.

Figure 4:
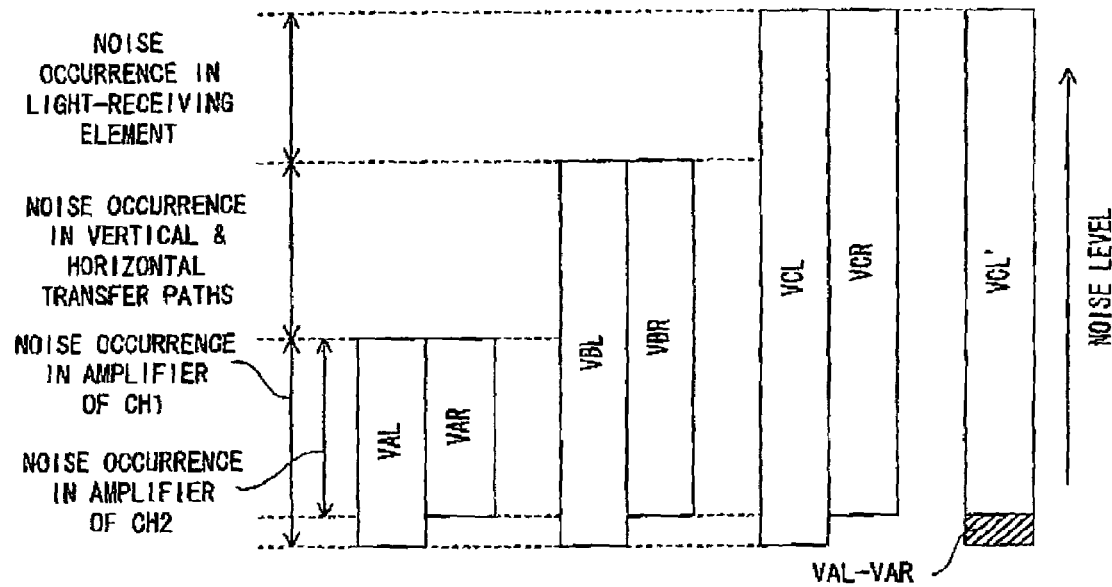
FIG. 4 is an illustrative view showing one part of operation of the FIG. 1 embodiment.

Referring to FIG. 4, the preliminary feeding level VAL includes noise caused in the amplifier 14a, and the preliminary feeding level VAR includes noise caused in the amplifier 14b. The optical black level VBL further includes noise caused in the vertical transfer registers and the horizontal transfer registers HL assigned to the left non-sensor area, and the optical black level VBR further includes noise caused in the vertical transfer registers and the horizontal transfer registers HR assigned to the left non-sensor area. The optical black level VCL further includes noise caused in the light-receiving elements, and the optical black level VCR further includes noise caused in the light-receiving elements.

The noise caused on the imaging surface of the CCD imager 14 (light-receiving elements, vertical transfer registers) does not differ significantly from place to place. Also, the noise caused in the horizontal transfer registers HL and HR show no greatly large differences. However, the noise caused in the amplifiers 14a and 14b may make great differences due to variations in amplification characteristics. As a consequence, the preliminary feeding levels VAL and VAR may differ from each other as shown in FIG. 4.

Figure 5:
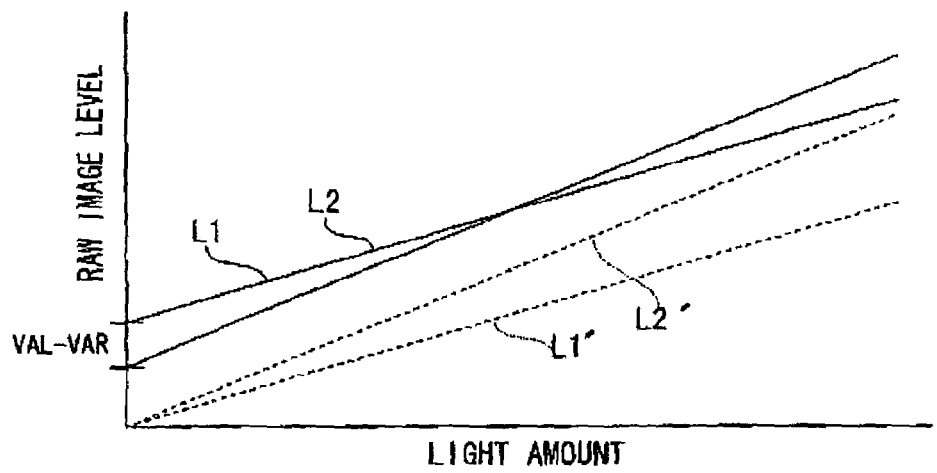
FIG. 5 is a graph showing one example of changes in signal level with respect to light amount.

Referring to FIG. 5, a light amount-raw image level characteristic of the channel CH1 is defined by a straight line L1, and a light amount-raw image level characteristic of the channel CH2 is defined by a straight line L2. A difference in gradient between the straight lines L1 and L2 results from variations in amplification factor of the amplifiers 14a and 14b. Moreover, if the light amount is zero, the level difference becomes "VAL−VAR".

Returning to FIG. 1, a CDS/AGC/AD circuit 20 subjects the raw image signal from the channel CH1 to correlation double sampling, automatic gain adjustment and A/D conversion. In a similar way, a CDS/AGC/AD circuit 28 subjects the raw image signal from the channel CH2 to correlation double sampling, automatic gain adjustment and A/D conversion. Additionally, the CDS/AGC/AD circuits 20 and 28 execute the processes in synchronization with the timing signals from the TG 18.

An adder 22 forming a clamp circuit 42 inputs raw image data output from the CDS/AGC/AD circuit 20 and offset data held by a register 26, and subtracts a data value of the offset data from a data value of the raw image data. Likewise, an adder 30 forming a clamp circuit 44 inputs raw image data output from the CDS/AGC/AD circuit 28 and offset data held by a register 34, and subtracts a data value of the offset data from a data value of the raw image data. The raw image data from the adders 22 and 30 have subtracted data values. The raw image data output from the adder 22 is given to a plus terminal of an arithmetic unit 24, and the raw image data output from the adder 30 is provided to a plus terminal of an arithmetic unit 32.

A clamp level adjustment circuit 36 provides clamp level data (data value: LV1) to a minus terminal of the arithmetic unit 24 and provides clamp level data (data value: LV2) to a minus terminal of the arithmetic unit 32.

The arithmetic unit 24 subtracts the data value LV1 of the clamp level data from the data value of the raw image data from the channel CH1. Out of the subtracted data output from the arithmetic unit 24, the register 26 holds the subtracted data belonging to the time period CL shown in FIG. 3(A) as the above mentioned offset data. The arithmetic unit 32 also subtracts the data value LV2 of the clamp level data from the data value of the raw image data from the channel CH2. Out of the subtracted data output from the arithmetic unit 32, the register 34 holds the subtracted data belonging to the time period CR shown in FIG. 3(B) as the above mentioned offset data.

Consequently, the raw image data from the channel CH1 is subjected to a digital clamp process according to the data value LV1, and the raw image data from the channel CH2 is subjected to a digital clamp process according to the data value LV2. That is, the black level of the raw image from the channel CH1 is set at the clamp level LV1, and the black level of the raw image from the channel CH2 is set at the clamp level LV2.

A signal processing circuit 38 subjects the raw image data output from the adders 22 and 30 to a series of processes including channel matching, color separation, white balance adjustment, YUV conversion and NTSC coding to produce a composite video signal in NTSC format. The produced composite video signal is provided to an LCD monitor 40. The CCD imager 14 is driven at a frame rate of 30 fps, and thus images of object scene in smooth motion are output from the LCD monitor 40.

Figure 6:
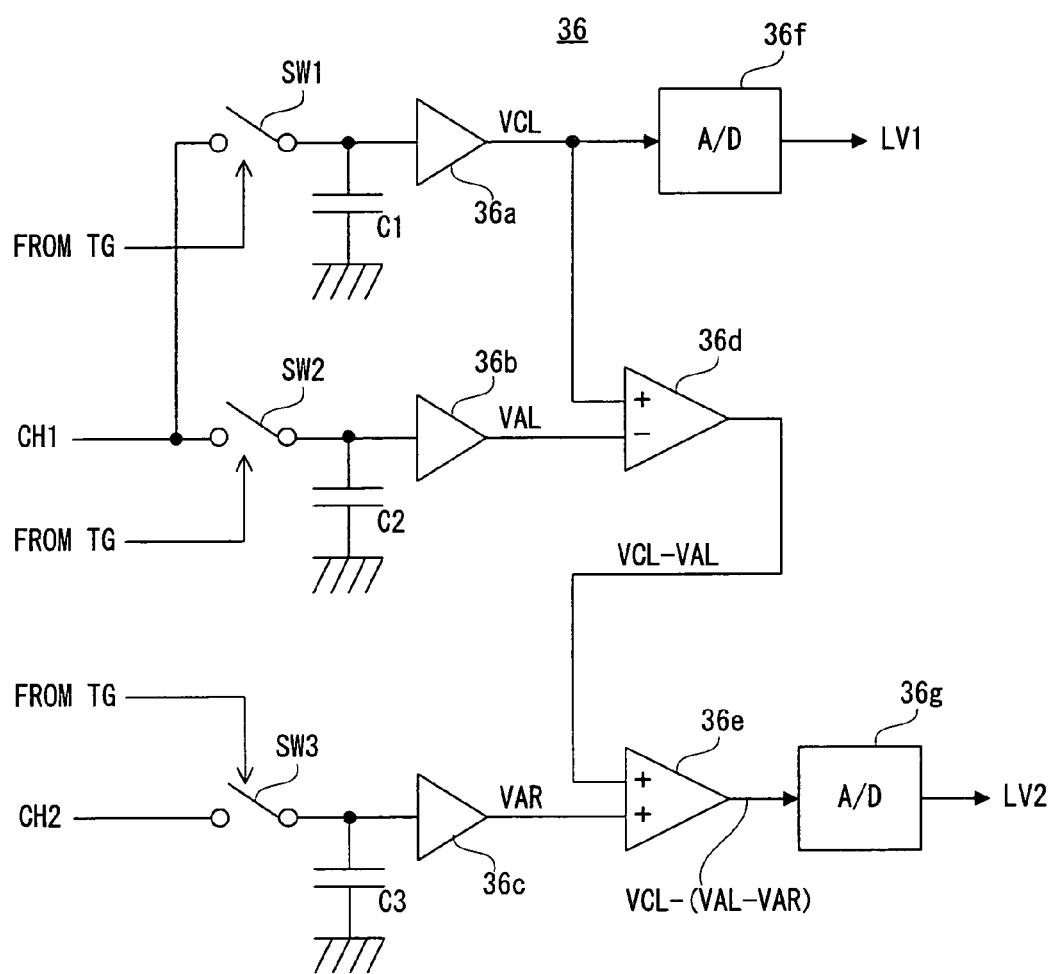
FIG. 6 is a block diagram showing one example of configuration of a clamp level adjustment circuit applied to the FIG. 1 embodiment.

The clamp level adjustment circuit 36 is configured as shown in FIG. 6. The raw image signal from the channel CH1 output through the CCD imager 14 is given to switches SW1 and SW2. The raw image signal from the channel CH2 output through the CCD imager 14 is given to a switch SW3.

The TG 18 turns on the switches SW1 and SW2 at the time periods CL and AL shown in FIG. 3(A), respectively, and turns on the switch SW3 at the time period AR shown in FIG. 3(B). Therefore, the optical black level VCL of the raw image signal from the channel CH1 is held by a capacitor C1, the preliminary feeding level VAL of the raw image signal from the channel CH1 is held by a capacitor C2, and the preliminary feeding level VAR of the raw image signal from the channel CH2 is held by a capacitor C3.

The optical black level VCL held by the capacitor C1 is given via a buffer 36a to the A/D converter 36f and a plus terminal of the arithmetic unit 36d. Also, the preliminary feeding level VAL held by the capacitor C2 is provided via a buffer 36b to a minus terminal of the arithmetic unit 36d. Moreover, the preliminary feeding level VAR held by the capacitor C3 is provided via a buffer 36c to a plus terminal of the arithmetic unit 36e.

The arithmetic unit 36d subtracts the preliminary feeding level VAL from the optical black level VCL, and provides a subtraction level "VCL−VAL" to the other plus terminal of the arithmetic unit 36e. The arithmetic unit 36e adds up the preliminary feeding level VAR and the subtraction level "VCL−VAL", and provides a subtraction level "VCL−(VAL−VAR)" to the A/D converter 36g.

The A/D converter 36f outputs clamp level data with a data value corresponding to the optical black level VCL (=LV1). In addition, the A/D converter 36g outputs clamp level data with a data value corresponding to the subtraction level "VCL−(VAL−VAR)" (=LV2). Moreover, the digital clamp process according to those clamp level data is carried out in the above described procedure. As a consequence, the light amount-raw image level characteristic of the channel CH1 changes from the straight line L1 to L1' shown in FIG. 5. The light amount-raw image level characteristic of the channel CH2 changes from the straight line L2 to L2' shown in FIG. 5.

As can be understood from the above description, the CCD imager 14 has the imaging surface in which the left sensor area (the first photoelectric conversion area) are formed and the right sensor area (the second photoelectric conversion area) and the horizontal transfer registers HL and HR assigned to the left sensor area and the right sensor area, respectively. The raw image (the first partial image) from the channel CH1 produced in the left sensor area is output through the amplifier 14a when it is driven by the driver 16a (the first driver), the raw image (the second partial image) from the channel CH2 produced in the right sensor area is output through the amplifier 14b when it is driven by the driver 16b (the second driver).

The raw image from the channel CH1 is subjected by the clamp circuit 42 (the first clamper) to a clamp process according to the clamp level LV1 (the first clamp level). Also, the raw image from the channel CH2 is subjected by the clamp circuit 44 (the second clamper) to a clamp process according to the clamp level LV2 (the second clamp level). Here, the clamp level LV1 is set by the A/D converter 36f (the first setter) forming the clamp level adjustment circuit 36. In addition, the clamp level LV2 is set by the A/D converter 36g (the second setter) forming the clamp level adjustment circuit 36.

The clamp level LV1 matches the optical black level VCL of the raw image from the channel CH1. On the other hand, the clamp level LV2 matches the subtraction level "VCL−(VAL−VAR)" found by subtracting a difference between the preliminary feeding level VAL of the raw image from the channel CH1 and the preliminary feeding level VAR of the raw image from the channel CH2, from the black level VCL of the raw image from the channel CH1. Besides, the subtraction level "VCL−(VAL−VAR)" is calculated by the arithmetic units 36d and 36e (the subtracters).

The two raw images are output from the different channels CH1 and CH2, respectively, which may cause a discrepancy between levels of noises superimposed on the raw images, that is, levels of external noises.

Here, the level of the external noise superimposed on the raw image from the channel CH1 can be equated with the preliminary feeding level VAL of the raw image from the channel CH1. The level of the external noise superimposed on the raw image from the channel CH2 can be equated with the preliminary feeding level VAR of the raw image from the channel CH2. Accordingly, the difference between the preliminary feeding levels VAL and VAR can be regarded as a discrepancy amount of external noise.

Thus, in this embodiment, the optical black level VCL of the raw image from the channel CH1 is taken as the clamp level LV1, while the subtraction level "VCL−(VAL−VAR)" determined by subtracting the difference between the preliminary levels VAL and VAR from the optical black level VCL of the raw image from the channel CH1 is assumed as the clamp level LV2. This dissolves the discrepancy between the clamp levels LV1 and LV2 resulting from the external noises.

In addition, the both clamp levels LV1 and LV2 are set according to the optical black level VCL of the raw image from the channel CH1. This eliminates the discrepancy between the clamp levels LV1 and LV2 resulting from the difference between the optical black level VCL of the raw image from the channel CH1 and the optical black level VCR of the raw image from the channel 2. As a result, it is possible to improve the quality of an image to be displayed on the LCD monitor 40.

Besides, the sensor area formed on the imaging surface is divided into two in this embodiment, and alternatively, the sensor area may be divided into three or more. Moreover, the left OB area and the right OB area are the same in size in this embodiment, and alternatively, they may have different sizes. Furthermore, this embodiment employs digital clamp operation, and the present invention may also apply to analog clamp operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
    an imager having an imaging surface in which a first photoelectric conversion area and a second photoelectric conversion area are formed and a first output path and a second output path assigned to said first photoelectric conversion area and said second photoelectric conversion area, respectively;
    a first driver for outputting from said first output path a first partial image produced in said first photoelectric conversion area;
    a second driver for outputting from said second output path a second partial image produced in said second photoelectric conversion area;
    a first damper for subjecting the first partial image output from said first output path to a clamp process according to a first clamp level;
    a second damper for subjecting the second partial image output from said second output path to a clamp process according to a second clamp level;
    a first setter for setting a black level of the first partial image output from said first output path as the first clamp level;
    a subtracter for subtracting a difference between a preliminary feeding level of the first partial image output from said first output path and a preliminary feeding level of the second partial image output from said second output path, from the black level of the first partial image output from said first output path; and
    a second setter for setting the level determined by said subtracter as the second clamp level.

2. An electronic camera according to claim 1, wherein said first driver and said second driver output the first partial image and the second partial image, respectively, in a manner of raster scanning.

3. An electronic camera according to claim 1, wherein said first photoelectric conversion area has an optical black area, and said first setter includes a black level detector for detecting the black level with timing corresponding to said optical black area.

4. An electronic camera according to claim 1, further comprising a producer for producing one screen of still image based on the first partial image subjected by said first damper to a clamp process and the second partial image subjected by said second damper to a clamp process.

5. An electronic camera according to claim 4, wherein said first driver and said second driver output periodically the first partial image and the second partial image, respectively, and said producer produces periodically the still image.

6. An electronic camera according to claim 1, wherein said first photoelectric conversion area and said second photoelectric conversion area are adjacent to each other on said imaging surface.

7. An electronic camera according to claim 1, wherein said subtracter includes a black level detector for detecting the black level of the first partial image output from said first output path, a first preliminary feeding level detector for detecting the preliminary feeding level of the first partial image output from said first output path, a second preliminary feeding level detector for detecting the preliminary feeding level of the second partial image output from said second output path, a level subtracter for subtracting the preliminary feeding level detected by said first preliminary feeding level detector from the black level detected by said black level detector, and a level adder for adding result of subtraction by said first level subtracter to the preliminary feeding level detected by said second preliminary feeding level detector.

\* \* \* \* \*